United States Patent [19]

Turck

[11] 3,843,584

[45] Oct. 22, 1974

[54] PROCESS FOR THE PRODUCTION OF AQUEOUS POLYMER LATICES

[75] Inventor: Ulrich Turck, Marl, Germany

[73] Assignee: Chemische Werke Huls, Aktiengesellschaft, Germany

[22] Filed: Sept. 26, 1972

[21] Appl. No.: 292,461

[30] Foreign Application Priority Data

Oct. 6, 1971 Germany.............................. 2149854

[52] U.S. Cl. ....................... 260/29.7 T, 260/29.6 E, 260/29.6 MQ, 260/29.6 TA, 260/29.7 SE, 260/29.7 SQ, 260/80.7, 260/80.8, 260/80.81, 260/84.3, 260/95 R

[51] Int. Cl. ....... C08d 1/09, C08d 1/22, C08f 19/10, C08f 1/60, C08f 19/08

[58] Field of Search............... 260/29.7 T, 29.7 SQ, 260/29.6 MQ, 29.6 TA, 29.6 E, 80.7, 80.8, 80.81, 84.3, 95 R

[56] References Cited
UNITED STATES PATENTS 3,423,351   1/1969   Pierce et al........................ 260/29.6

FOREIGN PATENTS OR APPLICATIONS 1,284,549   5/1968   Germany 951,172   3/1964   Great Britain
1,016,434   1/1966   Great Britain

OTHER PUBLICATIONS

Blackley, "High Polymer Latices" Vol. I, pp. 271, 279, 285 (applied Science, London, 1966).

*Primary Examiner*—Allan Liebermann
*Assistant Examiner*—T. De Benedictis
*Attorney, Agent, or Firm*—Millen, Raptes & White

[57] ABSTRACT

A process for the production of aqueous polymer latices from a monomeric mixture, consisting of 40–65 percent by weight of styrene or substituted styrene, or mixtures thereof, 30–55 percent by weight of a fumaric acid diester of 2–4 carbon atoms in the alcohol component 1–10 percent by weight of a diene compound of four to five carbon atoms, and 0.3–4 percent by weight of an ethylenically unsaturated mono- or dicarboxylic acid, in the aqueous phase, at elevated temperatures. The process is characterized by the use of certain anionic and nonionic emulsifiers in specific amounts.

7 Claims, No Drawings

PROCESS FOR THE PRODUCTION OF AQUEOUS POLYMER LATICES

BACKGROUND OF THE INVENTION

In latex technology, it is desirable to produce latices which have a low viscosity with a high solids content, which are stable to electrolytes, which have a low coagulate content and are extensively without gel content (fisheyes), and which are waterproof as a film, i.e., resistant to swelling by water. Furthermore in the processing of the latice, it is desirable that there be no tendency to foam.

Heretofore, latices produced from a styrene and/or substituted styrene monomer composition are not known which combine all of the above desired advantageous properties. Prior art latices may possess several of the desired properties but none exhibit all of the desired properties.

Furthermore, it is desirable in latex production to prepare the latex according to the elementary method i.e., the process starts immediately with the monomer composition without requiring a seed latex.

In British Pat. No. 1,016,434, the production of latex dispersions is disclosed which consist essentially of acrylate but which can contain, as the comonomer, up to 30 percent of a mixture of styrene of butadiene with fumaric acid esters. The polymer dispersion is prepared in the presence of 0.2 – 10 parts, preferably 1.0 — 4.0 parts, of a mixture of equal parts of two anionic emulsifiers and in the presence of 2–15 parts, preferably 4–10 parts, of a nonionic emulsifier.

It is emphasized therein that the molecular weight of the nonionic emulsifier must amount to at least 500. A latex produced according to Example 1 of the British patent, using the monomer composition of the instant invention, turned completely into a paste (comparative Example 7, infra). Furthermore, in the instant invention, it is unnecessary to limit the nonionic emulsifiers to those having a molecular weight greater than 500, as demonstrated by Comparative Example 6, infra.

In U.S. Pat. No. 3,423,351, the production of monodisperse copolymer latices is described using certain emulsifier mixtures. A styrene - fumaric acid dibutyl ester latex produced analogously to Example 9 of the U.S. Patent contained 24 percent of coagulate (Comparative Example 8, infra).

British Pat. No. 951,172 describes the production of low-temperature stable latices. In the preparation of these latices, this patent discloses, inter alia, the use of mixtures, not set forth in detail, of ionic and nonionic emulsifiers. However, these are utilized for the polymerization of other monomer systems. The British patent does not disclose the emulsifier - initiator system of the instant application, which is particularly suitable for the polymerization of the monomer composition described herein.

U.S. Pat. No. 3,282,876 discloses the production of a copolymer latex according to a two-stage process. The experiments, described in the patent, disclose a mixture of an ionic emulsifier and a nonionic emulsifier. However, the latex prepared therewith is unsuitable as a binder for coatings.

German Pat. No. 1,284,549 describes the use of similar monomer compositions as those in the the instant application for the production of paint compositions. However, the latices of the instant application are markedly superior to those of German Pat. No. 1,284,549 with respect to coagulate content, stability, and blooming resistance.

SUMMARY OF THE INVENTION

It is an object of the present invention to produce a latex possessing the desired advantageous properties described above.

The process in accordance with this invention comprises the production of latices in the aqueous phase from a monomer mixture consisting of 40–65 percent by weight of styrene or substituted styrene, or mixtures thereof, 30–55 percent by weight of a fumaric acid diester of two to four carbon atoms in the alcohol component, 1–10 percent by weight of a diene compound of four to five carbon atoms, and 0.3–4 percent by weight of an ethylenically unsaturated mono- or dicarboxylic acid. The process is characterized by using, for the polymerization 0.1 – 1.0 parts, based on 100 parts of monomer mixture, of an anionic emulsifier selected from the group consisting of alkyl sulfates and/or alkyl sulfonates of 10–20 carbon atoms, alkyl-aryl sulfonates of 3–12 carbon atoms in the alkyl chain, and ammonium salts and/or alkali salts of $\alpha$-sulfofatty acids of 10–20 carbon atoms; 0.2–2 parts, based on 100 parts of monomer mixture, of a nonionic emulsifier selected from the group consisting of polyglycol produced by the reaction of 1 mol of fatty alcohols of 10–20 carbon atoms, and/or of 1 mol of alkyl phenols of 4–12 carbon atoms in the alkyl residue, with 3–30 mol of ethylene oxide; and, as the activator, 0.5–2 parts, based on 100 parts of monomer mixture, of a water-soluble peroxydisulfate.

DETAILED DISCUSSION

Suitable anionic emulsifiers are the surface-active alkyl sulfates or alkyl sulfonates of 10–20 carbon atoms, preferably 12–18 carbon atoms in the alkyl chain, or the alkylaryl sulfonates of 8–12 carbon atoms in the alkyl chain, or the salts of $\alpha$-sulfofatty acids of 10–20 carbon atoms in the chain. Suitable cations are $NH_4^+$, $Li^+$, $Na^+$, or $K^+$, or mixtures thereof. The anionic emulsifiers are utilized in amounts of between 0.1 and 1.0 parts, preferably between 0.2 and 0.5 parts, based on 100 parts of monomer. Specific examples of anionic emulsifiers are disodium $C_{16}$-$C_{18}$-fatty acid $\alpha$-sulfonate, paraffin sulfonate mixture having a median carbon atom number of 14 to 15, sodium laurylsulfate, sodium octylbenzene-sulfonate and alkalisalts of tetradecyl-, hexadecyl- and octadecyl-sulfate or mixtures thereof and of dodecyl-, hexadecyl- and octadecyl-sulfonates or mixtures thereof and of nonylbenzene-, decylbenzene and dodecylbenzene-sulfonate and of proply-, butyl and hexyl-naphthalene-sulfonate and mixtures thereof and mono- or di-alkalisalts of $\alpha$-sulfonated decanacid, dodecanacid or tetradecanacid or mixtures thereof or these $\alpha$-sulfo-fatty acid, whereby the carboxylic groups are esterified with methanol, ethanol or propanol.

Suitable nonionic emulsifiers are the polyglycol ethers obtained by the reaction of 3–30 mol of ethylene oxide with fatty alcohols of 10–20 carbon atoms or with alkyl phenols of 4–12 carbon atoms in the alkyl residue. Preferably, the polyglycol ethers are employed which are produced in the reaction of lauryl alcohol with 15–20 mol of ethylene oxide. The nonionic emulsifiers are employed in amounts of between 0.2 and 2 parts preferably 0.5–1.5 parts, based on 100 parts of monomer. Specific examples of nonionic emulsifers are oxyethylated lauryl alcohol having an average degree of oxyethylation of 17, oxyethylated lauryl alcohol having an average degree of oxyethylation of 4, oxyethylated nonylphenol having an average oxyethylation of 20, decanol oxethylated with 3 to 10 moles ethylenoxide, dodencanol oxethylated with 3 to 20 moles of ethyleneoxide, hexadecanol or octadecanol oxethylated with 10 to 30 moles of ethyleneoxide, hexylphenol, octylphenol, nonylphenol, decylphenol or dodecylphenol oxethylated with 3 to 30 moles of ethyleneoxide.

According to the invention, a water-soluble persulfate is used as the initiator in a quantity of 0.5–2 parts, preferably 0.8–1.2 parts, based on 100 parts of monomer. Suitable specific persulfate compounds are ammonium peroxydisulfate, sodium peroxydisulfate, potassium peroxydisulfate, optionally in combination with sodium bisulfite. Ammonium peroxydisulfate is preferred, because of its good water solubility.

Styrene of substituted styrenes, or mixtures thereof, are utilized as the hardening component in the monomer mixture. Styrene is preferably used. Examples of substituted styrenes include α-methylstyrene, p-methylstyrene, α-methyl-p-methylstyrene, metaethylstyrene, p-isopropylstyrene, t-butylstyrene and halogenated derivatives thereof. The hardening component is employed in amounts of 40–65 percent by weight, preferably 45–60 percent by weight, of the monomer mixture.

A diene compound of 4–5 carbon atoms is employed as a plasticizing component in the monomer mixture. Suitable diene compounds are butadiene or substituted butadiene, such as isoprene or chlorobutadiene. Butadiene is preferred. This plasticizing component is used in amounts of 1–10 percent by weight, preferably in amounts of 4–7 percent by weight, of the monomer mixture.

Fumaric acid diesters with 2–4 carbon atoms in the alcohol component are another component of the monomer mixture. Fumaric acid dibutyl ester is preferred. This component is added in amounts of 30–55 percent by weight, preferably in quantities of 35–50 percent by weight of the monomer mixture.

The monomer mixture also contains an ethylenically unsaturated nomo- or dicarboxylic acid. Suitable α-β-unsaturated acids are acrylic acid, methacrylic acid, maleic acid, or fumaric acid. Acrylic acid is preferred. The acids are added in amounts of 0.3–4 percent by weight, preferably in amounts of 0.5–3 percent by weight, of the monomer mixture. The unsaturated acid is one having three to five carbon atoms.

Preferred latices are those containing styrene and fumaric acid dibutyl ester in a ratio of 2 : 1 to 1 : 1, as well as about 5 percent of butadiene and 1 percent of acrylic acid.

Molecular weight controlling agents can be used, for example, mercaptans, such as tert.-dodecyl mercaptan in quantities of between 0 and 1 percent by weight of the monomer mixture. The pH during the polymerization ranges between 1.5 and 4.5 and can be adjusted, if necessary, by the addition of ammonia or buffer salts, such as, e.g. sodium pyrophosphate. After the polymerization, the latex is adjusted to a pH of between 7 and 9 with ammonia or sodium hydroxide solution. The polymerization process of this invention is conducted at temperatures of between 45° and 90° C., preferably between 55° and 80° C.

By means of the emulsifier/initiator system of this invention, it is possible to obtain latices which have the desired advantageous properties set forth hereinabove, which make it possible to avoid the above-mentioned disadvantages, and which exhibit a number of excellent properties. The invention is characterized in that, the sum total of the desired properties can be obtained only within the relatively narrow ranges of materials used, determined by the type and quantity of emulsifier and initiator.

If larger amounts of anionic emulsifiers than specified above are used, the particle size of the dispersion is reduced. This results in a drop in stability, and consequently, an increased formation of coagulate and a rise in viscosity. Also the water stability is impaired thereby. Furthermore, reaction is accelerated in such a manner that temperature control becomes difficult (Comparative Example 1, infra).

When using too low an amount of anionic emulsifier, or none at all, the reaction times become longer and the proportions of the coagulate and the gel content (fisheye content) are increased (Comparative Examples 2 and 3, infra).

If larger amounts of nonionic emulsifier are used that those specified above, a drop in water stability and surface tension results. If the nonionic emulsifier is omitted altogether, it is possible to obtain gel-free latices, but the proportion of coagulate rises and the stability of the latex is too low (Comparative Example 4, infra).

The persulfate is an essential, stabilizing factor. If the persulfate concentration is lower than that specified above, the latices of this invention cannot be produced, since the proportion of coagulate becomes too high (Comparative Example 5, infra). Persulfate concetrations which are higher than specified above, on the other hand, impair the water stability and result in an increased gel content.

The latices prepared with the aid of the emulsifier-/initiator system of this invention can all be produced to an extent of about 50 percent solids content by the elementary method. Consequently, it is unnecessary to effect time-consuming concentration procedures to obtain the solids contents required for processing into coating compositions. In the case of less stable dispersions, the production of a latex with 50 percent solids content proceeds over several stages. First of all, the latex is prepared with a solids content of 30–40 percent, then agglomeration is effected, and finally, the mixture is concentrated to 50 percent solids content. It is a great advantage in the production of the latices of this invention that all necessary substances can be charged into the reaction vessel (polymerization reactor) at the beginning. The production is furthermore simplified by the fact that the reaction takes place at a uniform rate so that temperature control is simplified. The reaction period requires about 10–20 hours until termination, and conversions of at least 99.5 percent are obtained. It is desirable to obtain as complete a conversions of the monomers as possible, since the removal of residual monomers requires additional, voluminous process steps.

After the reaction is terminated, any coagulate still present is separated by screening. The proportion of coagulate is basically below 1.5 percent. Due to the relatively minor content of emulsifier, the dispersions of this invention exhibit a high surface tension of 45–50 dyne/cm. After adjusting to a pH of 8.5, the surface tension drops to 40–45 dyne/cm. The tendency of the dispersions toward foaming is small. The dispersions, adjusted to a pH of 8.5, exhibit an excellent resistance to electrolytes. All dispersions produced by this invention are stable with respect to an equal volume of a 10 percent strength sodium chloride solution and, in part, also with respect to a 2.5 percent strength calcium chloride solution. A good compatibility and fillability with pigments and fillers accompanies the electrolyte stability.

The viscosities of the dispersions of this invention are low, even in the alkaline pH range. The efflux time, in a 4mm. Ford beaker, ranges between 12 and 16 seconds. Dispersions with similar solids content, produced by other processes, often exhibit rather high viscosities and they must then be agglomerated in order to provide them with better processability. High viscosities present difficulties, for example, in the incorporation of pigments and also in the production of coating compositions, wherein additional binders are to be added having a thickening effect. With the latices of this invention, the incorporation of fillers is simplified.

The dispersions produced by the present invention have excellent film forming properties producing clear, dense films, which display high water stabilities because of the low content of emulsifier. Because of their high film density, the dispersions are particularly suitable as coating compositions. Paint films, produced from the dispersions of this invention have the property of being self-cleaning without simultaneously tending toward yellowing, due to the low content of butadiene. This characteristic, combined with a very high pigmentbinding capability and good abrasion resistance, renders the dispersions especially suitable for the production of paints.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the following examples, abbreviations are used as follows:

EA = oxyethylated lauryl alcohol having an average degree of oxyethylation of 17
EB = disodium $C_{16}/C_{18}$-fatty acid $\alpha$-sulfonate
EC = paraffin sulfonate mixture having a median carbon atom number of 14 to 15
ED = oxyethylated lauryl alcohol having an average degree of oxyethylation of 4
EE = sodium dodecylbenzenesulfonate
EF = sodium sulfosuccinic acid dioctyl ester
EG = oxyethylated nonylphenol having an average degree of oxyethylation of 20

EXAMPLE 1

The following materials were charged into a polymerization stainless steel reactor having a capacity of 12 liters:

| 100 | parts by weight of | water |
|---|---|---|
| 1.0 | do. | EA |
| 0.3 | do. | EB |
| 47 | do. | styrene |
| 46 | do. | dibutyl ester of fumaric acid |
| 1.0 | do. | acrylic acid |
| 0.5 | do. | tert.-dodecyl mercaptan |
| 0.8 | do. | ammonium peroxydisulfate |

After purging three times with nitrogen and evacuation, 6 parts by weight of butadiene was charged into the reactor and heated to 70°C. The reaction was terminated after 12½ hours at 70° C. The proportion of coagulate was 0.6 percent. The dispersion was free of gels (fisheyes), exhibited a solids content of 49.3 percent, and a content of residual monomer of 0.2 percent. The pH was 2.2, and the surface tension 47.7 dyne/cm. The dispersion, adjusted to pH 8.5, had a surface tension of 42.5 dyne/cm., an efflux time of 14.2 seconds in a 4 mm. Ford beaker, and was stable with respect to an equal volume of 10 percent strength sodium chloride solution or 2.5 percent strength calcium chloride solution.

EXAMPLE 2

The following materials were charged into a polymerization reactor having a capacity of 12 liters:

| 100 | parts by weight of | water |
|---|---|---|
| 1.5 | do. | EA |
| 0.2 | do. | EC |
| 59.5 | do. | styrene |
| 36 | do. | dibutyl ester of fumaric acid |
| 0.5 | do. | acrylic acid |
| 0.5 | do. | tert.-dodecyl mercaptan |
| 0.8 | do. | ammonium peroxydisulfate |

After purging with nitrogen three times and evacuating, 4 parts by weight of butadiene was charged into the reactor and heated to 70° C. After 16½ hours, the reaction was terminated. The dispersion contained 0.9 percent of coagulate, 0.2 percent of residual monomer and was gel-free. The solids content was 49.6 percent, the pH was 2.0, the surface tension was 47.9 dyne/cm. The dispersion, adjusted to pH 8.5, exhibited a surface tension of 43.9 dyne/cm., an efflux time in a 4 mm Ford beaker of 13.5 seconds, and was stable with respect to an equal volume of 10 percent strength sodium chloride solution or 2.5 percent strength calcium chloride solution.

EXAMPLE 3

The following materials were charged into a polymerization reactor having a capacity of 12 liters:

| 100 | parts by weight of | water |
|---|---|---|
| 1.0 | do. | EA |
| 0.2 | do. | EC |
| 46 | do. | styrene |
| 46 | do. | dibutyl ester of fumaric acid |
| 3.0 | do. | acrylic acid |
| 0.6 | do. | ammonium peroxydisulfate |

After purging three times with nitrogen and evacuating, 5 parts by weight of butadiene was charged into the reactor and heated to 70° C. After 10 hours, the reaction was terminated. The dry content was 49.1 percent, the residual monomer content was 0.2 percent. The dispersion was practically gel-free and contained 1.4 percent of coagulate. The pH was 2.2, and the surface tension was 45.7 dyne/cm. The dispersion, adjusted to pH 8.5, had a surface tension of 38.4 dyne/cm., an efflux time in a 4 mm. Ford beaker of 18.5 seconds, and was stable with respect to an equal volume of 10 percent strength sodium chloride solution.

EXAMPLE 4

The following materials were charged into a polymerization reactor having a capacity of 12 liters:

| 100 | parts by weight of | water |
|---|---|---|
| 1.0 | do. | EA |
| 0.3 | do. | EB |
| 62 | do. | styrene |
| 35 | do. | diethyl ester of fumaric acid |
| 1.0 | do. | acrylic acid |
| 0.8 | do. | ammonium peroxydisulfate |

After purging three times with nitrogen and evacuation, 2 parts by weight of butadiene was introduced and heated to 60° C. After 8½ hours, a solids content of 35 percent was attained, whereupon the mixture was heated to 75° C. After a total of 13½ hours, the reaction was completed. The dispersion contained 0.6 percent of coagulate and was free of gels. The solids content was 50.4 percent, and the content of residual monomer was 0.01 percent. The pH was 2.0, and the surface tension 49.4 dyne/cm. The dispersion, adjusted to pH 8.5, had a surface tension of 45.6 dyne/cm., an efflux time in a 4 mm. Ford beaker of 12.2 seconds, and was stable with respect to an equal volume of 10 percent strength sodium chloride solution or 2.5 percent strength calcium chloride solution.

EXAMPLE 5

The following materials were charged into a polymerization reactor having a capacity of 12 liters:

| 100 | parts by weight of | water |
|---|---|---|
| 1.0 | do. | EA |
| 0.3 | do. | EC |
| 47 | do. | styrene |
| 46 | do. | dibutyl ester of fumaric acid |
| 1.0 | do. | acrylic acid |
| 1.0 | do. | ammonium peroxydisulfate |

After purging three times with nitrogen and evacuation, 6 parts by weight of butadiene was introduced and heated to 60° C. A solids content of 35 percent was reached after 7½ hours, whereafter the mixture was heated to 75° C. After a total of 15 hours, the reaction was terminated. The reactor contained 0.9 percent of coagulate and the dispersion was gel-free. The solids content was 49.1 percent and the residual monomer content was 0.2 percent. The pH was 2.2 and the surface tension 47.3 dyne/cm. The dispersion, adjusted to pH 8.5, displayed a surface tension of 40.6 dyne/cm., an efflux time in a 4 mm. Ford beaker of 14.5 seconds, and was stable against an equal volume of 10 percent strength sodium chloride solution.

COMPARATIVE EXAMPLE 1

This example corresponds to Example 5, but 1.2 parts by weight of EC was utilized instead of 0.3. The reaction was very brisk at the beginning and was terminated after 9 hours. The proportion of coagulate was 4 percent. The dispersion, adjusted to pH 8.5, had a surface tension of 41.6 dyne/cm. and an efflux time in a 4 mm. Ford beaker of 19.0 seconds.

COMPARATIVE EXAMPLE 2

The experiment corresponds to Example 5, but only 0.05 part by weight of EC was employed instead of 0.3. The reaction was terminated after 21 hours. The coagulate proportion was 4.5 percent and the dispersion contained several gels (fisheyes).

COMPARATIVE EXAMPLE 3

The experiment corresponds to Example 5, but EC was omitted entirely. The reaction was completed after 24 hours. The proportion of coagulate was 6 percent, and the dispersion contained several gels.

COMPARATIVE EXAMPLE 4

The experiment corresponds to Example 5, but EA was omitted entirely. The reaction was terminated after 16 hours. The proportion of coagulate was 2.2 percent. The dispersion, adjusted to pH 8.5, was not stable against an equal volume of 10 percent strength sodium chloride solution.

COMPARATIVE EXAMPLE 5

The experiment corresponds to Example 5, but only 0.4 part by weight of ammonium peroxydisulfate was utilized instead of 1.0. The reaction was completed after 17 hours. The proportion of coagulate was 12 percent, and the residual dispersion contained additional precipitations.

COMPARATIVE EXAMPLE 6

The experiment corresponds to Example 5, but 0.5 part by weight of ED was used in place of 1.0 part by weight of EA. The reaction was terminated after 12 hours. The reactor contained 1.4 percent of coagulate, and the dispersion was gelfree. The solids content was 49.5 percent, and the content of residual monomer was 0.2 percent. The pH was 1.9, and the surface tension was 48.9 dyne/cm. The dispersion, adjusted to pH 8.5, has a surface tension of 42.3 dyne/cm., an efflux time in a 4 mm. Ford beaker of 12.8 seconds, and was stable with respect to an equal volume of 10 percent strength sodium chloride solution.

COMPARATIVE EXAMPLE 7

The following materials were charged into a polymerization reactor having a capacity of 12 liters (cf. British Pat. No. 1,016,434, Example 1):

| 100 | parts by weight of | water |
|---|---|---|
| 7 | do. | EA |
| 1.5 | do. | EE |
| 1.5 | do. | EF |
| 46 | do. | styrene |
| 46 | do. | dibutyl ester of fumaric acid |
| 2 | do. | acrylic acid |
| 0.4 | do. | potassium peroxydisulfate |

After purging three times with nitrogen and evacuation, 6 parts by weight of butadiene was introduced and heated to 60° C. The reaction was very violent in the beginning and was terminated after 10 hours. The reaction product was a paste devoid of flowability, i.e., not capable of flowing.

COMPARATIVE EXAMPLE 8

The following materials were charged into a polymerization reactor having a capacity of 12 liters (cf. U.S. Pat. No. 3,423,351, Example 9):

| 100 | parts by weight of | water |
| --- | --- | --- |
| 3.63 | do. | EG |
| 1.36 | do. | EF |
| 50 | do. | styrene |
| 50 | do. | dibutyl ester of fumaric acid |
| 0.63 | do. | potassium peroxydisulfate |

After purging with nitrogen three times, the reaction mixture was heated to 60° C. under a nitrogen pressure of 1 atmosphere gauge. The reaction was violent at the beginning, but then slowed down and was terminated after 18 hours. The proportion of coagulate was 24 percent, and the solids content was only 38 percent.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of polymer latices in the aqueous phase comprising polymerizing a mixture of monomers in an aqueous solution at elevated temperatures, said monomer mixture consisting, by weight, a. 40–65 percent of monomer selected from the group consisting of styrene, substituted styrene, and mixtures thereof,
   b. 30–55 percent of a fumaric acid diester having 2–4 carbon atoms in the alcohol component,
   c. 1–10 percent of a diene compound of 4–5 carbon atoms,
   d. 0.3–4 percent of an ethylenically unsaturated acid having one to two carboxylic groups, said aqueous solution comprising the following materials each based on 100 parts of monomer mixture, e. 0.1–1.0 parts of an anionic emulsifier selected from the group consisting of (1) alkyl sulfates having 10–20 carbon atoms, alkyl sulfonates having 10–20 carbon atoms, and mixtures thereof, (2) alkylaryl sulfonates having 8–12 carbon atoms in the alkyl chain and mixtures thereof, (3) ammonium salts of α-sulfofatty acids having 10–20 carbon atoms and mixtures thereof, (4) alkali salts of α-sulfofatty acids having 10–20 carbon atoms, and mixtures thereof,
   f. 0.2–2 parts of a nonionic emulsifier selected from the group consisting of a polyglycol ether produced by the reaction of 1 mol of fatty alcohols of 10–20 carbon atoms with 3–30 mol of ethylene oxide, a polyglycol ether produced by the reaction of 1 mol of alkyl phenols of 4–12 carbon atoms in the alkyl chain with 3–30 mol of ethylene oxide, and mixtures thereof,
   g. 0.5–2 parts of a water soluble peroxydisulfate, said polymer latices produced having a low viscosity with a high solids content, being stable to electrolytes, having a low coagulate content, and being substantially free of gels.

2. A process in accordance with claim 1 wherein said monomer mixture consists of 45–60 percent styrene, 35–50 percent fumaric acid dibutyl ester, 4–7 percent butadiene, and 0.5–3 percent acrylic acid, said nonionic emulsifier is 0.5–1.5 parts oxyethylated lauryl alcohol having an average degree of oxyethylation of 17, said anionic emulsifier is 0.2–0.5 parts disodium $C_{16}$-$C_{18}$-fatty acid α-sulfonate, and said water soluble peroxydisulfate is 0.8–1.2 parts ammonium peroxydisulfate.

3. A process in accordance with claim 1 wherein said monomer mixture consists of 45–60 percent styrene, 35–50 percent fumaric acid dibutyl ester, 4–7 percent butadiene, and 0.5–3 percent acrylic acid, said nonionic emulsifier is 0.5–1.5 parts oxyethylated lauryl alcohol having an average degree of oxyethylation of 17, said anionic emulsifier is 0.2–0.5 parts paraffin sulfonate mixture having a median carbon atom number of 14 to 15, and said water soluble peroxydisulfate is 0.8–1.2 parts ammonium peroxydisulfate.

4. A process in accordance with claim 1 wherein said polymerization is conducted at a temperature between 45° and 90° C.

5. An aqueous polymerizable composition for producing polymer latices in the aqueous phase having a low viscosity with a high solids content, being stable to electrolytes, having a low coagulate content, and being substantially free of gels, said aqueous composition comprising 100 parts of monomer mixture which consists by weight of a. 40–65 percent of a monomer selected from the group consisting of styrene, substituted styrene, and mixtures thereof,
   b. 30–55 percent of a fumaric acid diester having 2–4 carbon atoms in the alcohol component,
   c. 1–10 percent of a diene compound of 4–5 carbon atoms,
   d. 0.3–4 percent of an ethylenically unsaturated acid having one to two carboxylic groups, and said aqeous composition comprising the following materials each based on 100 parts of monomer mixture.

e. 0.1–1.0 parts of an anionic emulsifier selected from the group consisting of (1) alkyl sulfates having 10–20 carbon atoms, akly sulfonates having 10–20 carbon atoms, and mixtures thereof, (2) alkylaryl sulfonates having 8–12 carbon atoms in the alkyl chain and mixtures thereof, (3) ammonium salts of —sulfofatty acids having 10–20 carbon atoms and mixtures thereof, (4) alkali salts of —sulfofatty acids having 10–20 carbon atoms, and mixtures thereof,
   f. 0.2–2 parts of a nonionic emulsifier selected from the group consisting of a polyglycol ether produced by the reaction of 1 mol of fatty alcohols of 10–20 carbon atoms with 3–30 mol of ethylene oxide, a polyglycol ether produced by the reaction of 1 mol of alkyl phenols of 4–12 carbon atoms in the alkyl chain with 3–30 mol of ethylene oxide, and mixtures thereof,
   g. 0.5–2 parts of a water soluble peroxydisulfate.

6. The aqueous polymerizable composition of claim 5 wherein said monomer mixture consists of 45–60 percent styrene, 35–50 percent fumaric acid dibutly ester, 4–7 percent butadiene, and 0.5–3 percent acrylic acid, said nonionic emulsifier is 0.5–1.5 parts oxyethylated lauryl alcohol having an average degree of oxyethylation of 17, said anionic emulsifier is 0.2–0.5 parts disodium $C_{16}$ -$C_{18}$-fatty acid α-sulfonate, and said water soluble peroxydisulfate is 0.8–1.2 parts ammonium peroxydisulfate.

7. The aqueous polymerizable composition of claim 5 wherein said monomer mixture consists of 45–60 percent styrene, 35–50 percent fumaric acid dibutyl ester, 4–7 percent butadiene, and 0.54–30 percent acrylic acid, said nonionic emulsifier is 0.5–1.5 parts oxyethylated lauryl alcohol having an average degree of oxyethylation of 17, said anionic emulsifier is 0.2–0.5 parts paraffin sulfonate mixture having a median carbon atom number of 14 to 15, and said water soluble peroxydisulfate is 0.8–1.2 parts ammonium peroxydisulfate.

* * * * *

UNITED STATES PATENT OFFICE
CERTIFICATE OF CORRECTION

Patent No. 3,843,584          Dated October 22, 1974

Inventor(s) Ulrich Turck

It is certified that error appears in the above-identified patent and that said Letters Patent are hereby corrected as shown below:

IN THE CLAIMS:

CLAIM 7, LINE 4 OF THE CLAIM, COLUMN 11:

"0.54-30" should read -- 0.5-3 --.

Signed and sealed this 22nd day of April 1975.

(SEAL)
Attest:

RUTH C. MASON
Attesting Officer

C. MARSHALL DANN
Commissioner of Patents
and Trademarks